United States Patent
Alex et al.

(10) Patent No.: US 6,525,137 B1
(45) Date of Patent: Feb. 25, 2003

(54) POLYAMIDE CONVEYOR ELEMENTS

(75) Inventors: Patrick Alex, Limours-Pecqueuse (FR); Christian Capion Knudsen, Praesto (DK); Niels Peter Rosenkrands, Copenhague (DK)

(73) Assignee: Atofina, Puteaux (FR)

( * ) Notice: Subject to any disclaimer, the term of this patent is extended or adjusted under 35 U.S.C. 154(b) by 0 days.

(21) Appl. No.: 09/646,755

(22) PCT Filed: Jan. 20, 2000

(86) PCT No.: PCT/FR00/00125

§ 371 (c)(1),
(2), (4) Date: Dec. 1, 2000

(87) PCT Pub. No.: WO00/43298

PCT Pub. Date: Jul. 27, 2000

(30) Foreign Application Priority Data

Jan. 22, 1999 (FR) .............................. 99 00719

(51) Int. Cl.$^7$ ................................ C08L 77/00
(52) U.S. Cl. .................. 525/179; 525/181; 525/184; 525/66; 198/643; 198/957
(58) Field of Search ................ 198/643, 957; 525/66, 179, 181, 184

(56) References Cited

U.S. PATENT DOCUMENTS

| 4,391,951 A | | 7/1983 | Scheetz | |
|---|---|---|---|---|
| 4,471,867 A | * | 9/1984 | Forshee | 198/687 |
| 5,006,601 A | * | 4/1991 | Lutz et al. | 525/66 |
| 5,008,347 A | * | 4/1991 | Thill et al. | 525/433 |
| 5,504,139 A | * | 4/1996 | Davies et al. | 524/504 |
| 5,559,180 A | * | 9/1996 | Takahashi et al. | 524/512 |
| 5,683,818 A | | 11/1997 | Bolvari | |

FOREIGN PATENT DOCUMENTS

| DE | 20 45 899 | 3/1972 |
|---|---|---|
| DE | 42 36 461 | 5/1993 |
| EP | 0 284 379 | 9/1988 |
| GB | 2 183 263 | 6/1987 |

OTHER PUBLICATIONS

Du Pont, "Molding Guide: Zytel ® nylon resin", Rev. Aug. 1995.*

* cited by examiner

*Primary Examiner*—James J. Seidleck
*Assistant Examiner*—Melanie Bissett
(74) *Attorney, Agent, or Firm*—Millen, White, Zelano & Branigan, P.C.

(57) ABSTRACT

The invention relates to an improvement to conveyors comprising moving elements which slide over fixed elements such that at least one moving element made of a polyamide-based blend (A) slides over a fixed element made of polyacetal and/or such that at least one moving element made of polyacetal slides over a fixed element made of a polyamide-based blend (A).

30 Claims, No Drawings

POLYAMIDE CONVEYOR ELEMENTS

The present invention relates to polyamide conveyor elements and more particularly (i) to fixed profiles such as slideways and rails and (ii) to moving parts such as chain links which form all or part of the moving elements of the conveyor.

The present invention is particularly useful for chain conveyors. For example, Links from 1 to 5 cm in length, from 1 to 2 cm in width and from 1 to 2 cm in thickness are assembled in order to form an endless conveyor belt. It is possible, for example, to arrange from 1 to 10 links in the width direction, in order to form a belt from 1 to 20 cm in width, and several hundreds of links in the longitudinal direction along the length of the endless belt. The links are joined together but are articulated—thus they have a relative mobility so that the conveyor belt that they form can rotate, rise or fall. The fixed part consists of rails, slideways or plates over which the links of the chain slide.

A drive system, consisting of a roller or a toothed wheel and driven by a motor, moves the conveyor belt formed by all the links forwards. The links located on the outside of the belt may be provided with hooks or have a different shape from the other links because they are often used for guiding the belt and these links slide over fixed parts of the conveyor. Those links located on the inside of the belt may slide over a plate or over profiles. Usually, the links are obtained by moulding polymers and the fixed parts of the conveyor are made of stainless steel.

The links wear away by friction with the stainless steel. Fixed metal parts of the conveyor may be covered with a polyethylene wearing piece. In general, the links are made of polyacetal (polyoxymethylene). Polyacetals are described in Ullmann's Encyclopaedia of Industrial Chemistry, 5th Edition (1992), vol. A 21, pp 591–603.

Examples of chain conveyors are described in U.S. Pat. Nos. 5,749,454, 5,031,757, 5,497,874, 5,584,373 and 5,690,210.

The prior art, in U.S. Pat. No. 5,683,818, has described blends of nylon-6,6 and polypropylene which have to withstand friction on an unlubricated metal surface. These blends also comprise a maleicized polypropylene as compatibilizer and, optionally, polytetrafluoroethylene powder as lubricant. U.S. Pat. No. 5,504,139 describes blends of PA-6,6, high-density polyethylene and a maleicized ethylene-propylene as compatibilizer. These blends are presented as having to withstand friction.

JP 63,314,256 A describes blends of a polyamide and a copolymer of ethylene, an unsaturated carboxylic acid ester and maleic anhydride. It is stated that these blends withstand friction.

EP 234,819 describes blends similar to the above prior art and they are presented as being abrasion resistant.

EP 284,379 describes blends consisting of a polyamide matrix in which nodules of an ethylene-alkyl (meth)acrylate-maleic anhydride copolymer are dispersed, and dispersed in these nodules are polyamide nodules. These blends are also presented as having to be abrasion resistant.

U.S. Pat. No. 4,391,951 describes blends of nylon-6 (at least 50%), polytetrafluoroethylene (PTFE), polyethylene having a very high molar mass and an elastomeric polyester. This composition is supposed to extend the lifetime of the nylon-6 when it is subjected to friction.

The withstand behaviour of all these products is, to a greater or lesser extent, good.

The Applicant has found that conveyor elements made of particular blends of polyamide and polyolefin exhibited exceptional wear resistance when they slid over fixed elements made of polyacetal, and vice versa.

The present invention relates to an improvement to conveyors in which at least one moving element made of a polyamide-based blend (A) slides over a fixed element made of polyacetal and/or in which at least one moving element made of polyacetal slides over a fixed element made of a polyamide-based blend (A).

With regard to the blend (A), this has a polyamide matrix and contains polyolefin nodules.

The term "polyamide" should be understood to mean the products from condensation:

of one or more amino acids, such as aminocaproic, 7-aminoheptanoic, 11-aminoundecanoic and 12-aminododecanoic acids and of one or more lactams, such as caprolactam, oenantholactam and lauryl lactam;

of one or more salts or mixtures of diamines, such as hexamethylenediamine, dodecamethylenediamine, metaxylylenediamine, bis-p-aminocyclohexylmethane and trimethylhexamethylenediamine with diacids, such as isophthalic, terephthalic, adipic, azelaic, suberic, sebacic and dodecanedicarboxylic acids;

or mixtures of certain monomers, resulting in copolyamides.

It is possible to use polyamide blends. Advantageously, PA-6 and PA-6,6 are used.

The term "polyolefins" should be understood to mean polymers comprising olefin repeat units, such as, for example, ethylene repeat units, propylene repeat units, 1-butene repeat units, etc.

By way of example, mention may be made of:

polyethylene, polypropylene and copolymers of ethylene with alpha-olefins. These products may be grafted by anhydrides of unsaturated carboxylic acids, such as maleic anhydride, or unsaturated epoxides, such as glycidyl methacrylate;

ethylene copolymers with at least one product chosen from (i) unsaturated carboxylic acids, their salts or their esters, (ii) vinyl esters of saturated carboxylic acids, (iii) unsaturated dicarboxylic acids, their salts, their esters, their semi-esters or their anhydrides, and (iv) unsaturated epoxides. These ethylene copolymers may be grafted by anhydrides of unsaturated dicarboxylic acids or by unsaturated epoxides;

styrene/ethylene-butene/styrene block copolymers (SEBS), these optionally being maleicized.

It is possible to use blends of two or more of these polyolefins.

It is advantageous to use:

polyethylene, ethylene/alpha-olefin copolymers, ethylene/alkyl (meth)acrylate copolymers, ethylene/alkyl (meth)acrylate/maleic anhydride copolymers, the maleic anydride being grafted or copolymerized, ethylene/alkyl (meth)acrylate/glycidyl methacrylate copolymers, the glycidyl methacrylate being grafted or copolymerized, polypropylene.

In order to make it easier to form the polyamide matrix and if the polyolefins have few or no functional groups which can facilitate compatibilization, it is recommended to add a compatibilizer.

The compatibilizer is a product known per se for compatibilizing polyamides and polyolefins.

For example, mention may be made of:

polyethylene, polypropylene, ethylene/propylene copolymers and ethylene/butene copolymers, all these products being grafted by maleic anhydride or glycidyl methacrylate;

ethylene/alkyl (meth)acrylate/maleic anhydride copolymers, the maleic anhydride being grafted or copolymerized;

ethylene/vinyl acetate/maleic anhydride copolymers, the maleic anhydride being grafted or copolymerized;

the above two copolymers in which the maleic anhydride is replaced by glycidyl methacrylate;

ethylene/(meth)acrylic acid copolymers and optionally their salts;

polyethylene, polypropylene or ethylenepropylene copolymers, these polymers being grafted by a product having a site which reacts with amines, these grafted copolymers then being condensed with polyamides or oligomers of polyamides having only a single amine end group.

These products are described in EP 342,066, the contents of which are incorporated in the present application.

The amount of polyamide forming the matrix may be between 55 and 95 parts per 5 to 45 parts of polyolefins.

The amount of compatibilizer is the amount sufficient for the polyolefin to be dispersed in the form of nodules in the polyamide matrix. It may represent up to 20% of the weight of the polyolefin. These polymers are manufactured by blending a polyamide, a polyolefin and optionally a compatibilizer using the standard techniques of melt blending (twin-screw, Buss and single-screw melt blending).

Advantageously, the MFI of the polyamide is between 2 and 30 (2.16 kg/235° C.).

Advantageously, the viscosity of the dispersed phase (the polyolefin) is greater than that of the matrix.

Advantageously, the ratio of the viscosity of the polyolefin to the viscosity of the polyamide, these being measured at a shear rate of 600 s$^{-1}$, is greater than 0.7 and preferably between 0.75 and 2.

According to a first embodiment of the invention, the polyolefin is a high-density polyethylene (HDPE) and the compatibilizer is a polymer (C) which itself comprises a blend of a polyethylene (C1) and a polymer (C2) chosen from elastomers, very-low-density polyethylenes and ethylene copolymers, the (C1)+(C2) blend being cografted by an unsaturated carboxylic acid.

According to a second embodiment of the invention, the polyolefin is polypropylene and the compatibilizer is a polymer (C) resulting from the reaction of a copolymer (C1) of propylene and of an unsaturated monomer X, which is grafted or copolymerized, with a polyamide C2.

With regard to the first embodiment, the proportions (by weight) in (A) are advantageously the following:

55 to 70% of polyamide, preferably PA-6, 5 to 15% of compatibilizer, the balance being high-density polyethylene.

Preferably, the MFI is between 2 and 10 (2.16 kg/235° C.).

The compatibilizer for this first embodiment of the invention will now be described. The polyethylene (C1) may be chosen from the polyethylenes mentioned above.

Advantageously, (C1) is a high-density polyethylene (HDPE) having a density of between 940 and 965 kg/m$^2$.

The MFI of (C1) is between 0.1 and 3 (2.16 kg/190° C.).

The copolymer (C2) may, for example, be an ethylene/propylene elastomer (EPR) or ethylene/propylene/diene monomer (EPDM).

(C2) may also be a very-low-density polyethylene (VLDPE) which is either an ethylene homopolymer or an ethylene/alpha-olefin copolymer.

(C2) may also be an ethylene copolymer with at least one product chosen from (i) unsaturated carboxylic acids, their salts or their esters, (ii) vinyl esters of saturated carboxylic acids and (iii) unsaturated dicarboxylic acids, their salts, their esters, their semi-esters or their anhydrides.

Advantageously, (C2) is an EPR.

Advantageously, 60 to 95 parts of (C1) per 40 to 5 parts of (C2) are used.

The blend of (C1) and (C2) is grafted with an unsaturated carboxylic acid, i.e. (C1) and (C2) are cografted. It would not be outside the scope of the invention to use a functional derivative of this acid.

Examples of unsaturated carboxylic acids are those having from 2 to 20 carbon atoms, such as acrylic, methacrylic, maleic, fumaric and itaconic acids. The functional derivatives of these acids comprise, for example, anhydrides, ester derivatives, amide derivatives, imide derivatives and metal salts (such as alkali-metal salts) of the unsaturated carboxylic acids.

Unsaturated dicarboxylic acids having from 4 to 10 carbon atoms and their functional derivatives, particularly their anhydrides, are particularly preferred grafting monomers.

These grafting monomers comprise, for example, maleic, fumaric, itaconic, citraconic, allylsuccinic, cyclohex-4-ene-1,2-dicarboxylic, 4-methylcyclohex-4-ene-1,2-dicarboxylic, bicyclo[2.2.1]hept-5-ene-2,3-dicarboxylic and x-methylbicyclo[2.2.1]hept-5-ene-2,3-dicarboxylic acids and maleic, itaconic, citraconic, allylsuccinic, cyclohex-4-ene-1,2-dicarboxylic, 4-methylenecyclohex-4-ene-1,2-dicarboxylic, bicyclo-[2.2.1]hept-5-ene-2,3-dicarboxylic and x-methylbicyclo-[2.2.1]hept-5-ene-2,3-dicarboxylic anhydrides. Advantageously, maleic anhydride is used.

Various known processes may be used to graft a grafting monomer onto the blend of (C1) and (C2).

For example, this may be carried out by heating the polymers (C1) and (C2) to a high temperature—approximately 150° C. to approximately 300° C.—with or without the presence of a solvent and with or without a radical initiator.

In the blend of (C1) and (C2), which is modified by grafting, obtained in the abovementioned manner, the amount of grafting monomer may be suitably chosen, but it is preferably from 0.1 to 10% and better still from 600 ppm to 2% with respect to the weight of grafted (C1) and (C2).

The amount of grafted monomer is determined by quantitative measurement of the succinic functional groups by FTIR spectroscopy.

The MFI of (C), i.e. of (C1) and (C2) which have been cografted, is from 5 to 30 and preferably from 13 to 20 (2.16 kg/190° C.).

According to one particular embodiment of the invention, the polymer (C), i.e. cografted (C1) and (C2), is such that the $MFI_{10}/MFI_2$ ratio is greater than 18.5, $MFI_{10}$ denoting the melt flow index at 190° C. under a load of 10 kg and $MFI_2$ denoting the melt flow index under a load of 2.16 kg.

Advantageously, the $MFI_{20}$ of the blend (C) of cografted polymers (C1) and (C2) is less than 24. $MFI_{20}$ denotes the melt flow index at 190° C. under a load of 21.6 kg.

With regard to the second embodiment of the invention, the proportions (by weight) of the blend (A) are advantageously:

60 to 70% of polyamide, preferably PA-6 or PA-6,6, 20 to 30% of polypropylene, 3 to 10% of compatibilizer.

Preferably, the MFI is between 2 and 10 (2.16 kg/235° C.).

The MFI of the polypropylene is advantageously less than 0.5 and preferably between 0.1 and 0.5 (2.16 kg/230° C.).

Such products are described in EP 647,681.

The compatibilizer for this second embodiment of the invention will now be described.

The process starts by preparing (C1), which is either a propylene/unsaturated monomer X copolymer or a polypropylene onto which an unsaturated monomer X is grafted. X is any unsaturated monomer which can be copolymerized with propylene or grafted onto polypropylene and which has a functional group that can react with a polyamide. This functional group may be a carboxylic acid, a dicarboxylic acid anhydride, an epoxide, etc.

By way of example of a monomer X, mention may be made of (meth)acrylic acid, maleic anhydride, etc. and unsaturated epoxides, such as glycidyl (meth)acrylate. Advantageously, maleic anhydride is used. With regard to the grafted polypropylenes, X may be grafted onto propylene homopolymers or copolymers, such as ethylene-propylene copolymers containing (in moles) mostly propylene. The grafting operation is known per se.

(C2) is a polyamide or a polyamide oligomer. Polyamide oligomers are described in EP 342,066 and FR 2,291,225.

The polyamides (or oligomers) C2 are the products from the condensation of the monomers already mentioned above.

It is possible to use blends of polyamides. Advantageously, PA-6, PA-11, PA-12, the copolyamide containing 6-type repeat units and 12-type repeat units (PA-6/12) and the copolyamide based on caprolactam, hexamethylenediamine and adipic acid (PA-6/6.6) are used.

The polyamides or oligomers C2 may contain acid, amine or monoamine terminal groups. In order for the polyamide to have a monoamine terminal group, all that is required is to use a chain limiter having the formula:

in which:

$R_1$ is hydrogen or a linear or branched alkyl group containing up to 20 carbon atoms, $R_2$ is a linear or branched alkyl or alkenyl group having up to 20 carbon atoms, a saturated or unsaturated cycloaliphatic radical, an aromatic radical or a combination of the previous ones. The limiter may, for example, be laurylamine or oleylamine.

Advantageously, C2 is a PA-6, a PA-11 or a PA-12.

The proportion of C2 in C1+C2 by weight is advantageously between 0.1 and 60%.

The reaction between (C1) and (C2) is preferably carried out in the melt. It is possible, for example, to mix (C1) and (C2) in an extruder at a temperature generally between 230 and 250° C. The average residence time of the melt in the extruder may be between 10 seconds and 3 minutes and is preferably between 1 and 2 minutes.

The blends (A) of the invention may be prepared by melt blending in extruders (single-screw or twin-screw extruders), Buss kneaders, Brabender mixers and, in general, the usual devices for blending thermoplastics.

EXAMPLES

A chain conveyor consists of a section 0.7 m in width and 3.35 m in length, consisting of a stainless steel plate, and of another similar section, 0.7 m in width and 2.10 m in length, these sections being arranged flat and at right-angles and being connected by a section forming a quarter of a ring having an internal radius of 0.95 m and an external radius of (0.7+0.95) m.

The links 7 cm in width are arranged in tens across the width, forming a conveyor belt with a width of 0.7 m and a length equal to twice the length of the conveyor.

The links are articulated and have a shape such that the belt can turn through a right-angle between the two straight sections. The belt formed from all these links is driven by a motor and a toothed wheel which is located at the end of the conveyor on the 2.10 m section side. The external links are provided with hooks and guide the belt so that it remains on the plate forming the conveyor support. In the right-angled section, over the external part (that of large radius), the stainless steel plate is covered either with a profile made of a polyethylene of high molar mass (Comparative Ex. 1) or with a blend (A) according to the first embodiment of the invention and consisting of:

65% of a PA-6 having an MFI of 6 (2.16 kg/235° C.),

10% of a blend of HDPE and EPR in proportions of 75/25, grafted by 0.2% (by weight) of maleic anhydride, 25% of a high-density polyethylene having an MFI of 2 (2.16 kg/235° C.).

The largest friction values are developed in this external bend.

The links are made of polyacetal.

The speed of the driving toothed wheel, the tensile force (in pounds) on the conveyor belt and the temperature at the contact surface between the links and the profile which covers the external part of the right-angle section were measured.

The results are given in the table below.

It may be seen that, in the case of the profile made of polyethylene of high molar mass (UHMW), the tensile force of the belt with polyacetal links at 100 rpm is the same as that in the case of a profile made of the blend (A) for a speed of between 300 and 333 rpm, approximately.

| Speed (rpm) | Profile made of UHMW polyethylene | | Profile made of blend (A) | |
|---|---|---|---|---|
| | force (in lbs) | temperature (° C.) | force (in lbs) | temperature (° C.) |
| 33 | 116 | 34 | 108 | 25 |
| 66 | 159 | 45 | 120 | 29 |
| 100 | 170 | 51* | 120 | 32 |
| 133 | | | 141 | 36 |
| 166 | | | 149 | 40 |
| 200 | | | 153 | 43 |
| 233 | | | 151 | 41.5 |
| 266 | | | 145 | 43 |
| 300 | | | 165 | 56 |
| 333 | | | 179 | 56 |

*failure of the profile made of UHMW polyethylene

What is claimed is:

1. An improvement to a chain link conveyor comprising a chain link sliding over a fixed element, the improvement wherein said chain link comprises a polyacetal and the fixed element comprises a blend (A) of a polyamide matrix, wherein the blend (A) contains polyolefin nodules and also comprises by weight 55 to 70% polyamide, 5 to 15% compatibilizer, and the balance consisting essentially of high density polyethylene, and wherein the compatibilizer is a blend of a high-density polyethylene (C1) and a polymer (C2) chosen from elastomers, very-low-density polyethylenes and ethylene copolymers, the C1+C2 blend being cografted by an unsaturated carboxylic acid.

2. An improvement according to claim 1, said fixed element being at least one of a rail, a slide way and a plate.

3. An improvement according to claim 2, wherein said fixed element comprises a plate.

4. An improvement according to claim 3, wherein the polyamide is PA-6.

5. An improvement according to claim 1, wherein the polyamide is PA-6, PA-6,6 or a mixture thereof.

6. An improvement to a chain link conveyor comprising a chain link sliding over a fixed element, the improvement wherein said chain link comprises a polyacetal and the fixed element comprises a blend (A) of a polyamide matrix, wherein the blend (A) comprises by weight 55 to 70% polyamide, 5 to 15% compatibilizer, and the balance consisting essentially of high density polyethylene, and wherein the compatibilizer is a blend of a high-density polyethylene (C1) and a polymer (C2) chosen from elastomers, very-low-density polyethylenes and ethylene copolymers, the C1+C2 blend being cografted by an unsaturated carboxylic acid.

7. An improvement according to claim 6, said fixed element being at least one of a rail, a slide way and a plate.

8. An improvement according to claim 6, wherein said fixed element comprises a plate.

9. An improvement according to claim 6, wherein the polyamide is PA-6.

10. An improvement according to claim 6, wherein the polyamide is PA-6, PA-6,6 or a mixture thereof.

11. An improvement to a chain link conveyor comprising a chain link sliding over a fixed element, the improvement wherein said chain link comprises a polyacetal and the fixed element comprises a blend (A) of a polyamide matrix, wherein the blend (A) comprises by weight 55 to 70% polyamide, 5 to 15% compatibilizer, and the balance consisting essentially of high density polyethylene.

12. An improvement according to claim 11, said fixed element being at least one of a rail, a slide way and a plate.

13. An improvement according to claim 11, wherein said fixed element comprises a plate.

14. An improvement according to claim 11, wherein the polyamide is PA-6.

15. An improvement according to claim 11, wherein the polyamide is PA-6, PA-6,6 or a mixture thereof.

16. An improvement to a chain link conveyor comprising a chain link sliding over a fixed element, the improvement wherein said chain link comprises a blend (A) of a polyamide matrix and said moving element comprises a polyacetal, wherein the blend (A) contains polyolefin nodules and also comprises by weight 55 to 70% polyamide, 5 to 15% compatibilizer, and the balance consisting essentially of high density polyethylene, and wherein the compatibilizer is a blend of a high-density polyethylene (C1) and a polymer (C2) chosen from elastomers, very-low-density polyethylenes and ethylene copolymers, the C1+C2 blend being cografted by an unsaturated carboxylic acid.

17. An improvement according to claim 16, said fixed element being at least one of a rail, a slide way and a plate.

18. An improvement according to claim 16, wherein said fixed element comprises a plate.

19. An improvement according to claim 16, wherein the polyamide is PA-6.

20. An improvement according to claim 16, wherein the polyamide is PA-6, PA-6,6 or a mixture thereof.

21. An improvement to a chain link conveyor comprising a chain link sliding over a fixed element, the improvement wherein said chain link comprises a blend (A) of a polyamide matrix and said moving element comprises a polyacetal, wherein the blend (A) comprises by weight 55 to 70% polyamide, 5 to 15% compatibilizer, and the balance consisting essentially of high density polyethylene, and wherein the compatibilizer is a blend of a high-density polyethylene (C1) and a polymer (C2) chosen from elastomers, very-low-density polyethylenes and ethylene copolymers, the C1+C2 blend being cografted by an unsaturated carboxylic acid.

22. An improvement according to claim 21, said fixed element being at least one of a rail, a slide way and a plate.

23. An improvement according to claim 21, wherein said fixed element comprises a plate.

24. An improvement according to claim 21, wherein the polyamide is PA-6.

25. An improvement according to claim 21, wherein the polyamide is PA-6, PA-6,6 or a mixture thereof.

26. An improvement to a chain link conveyor comprising a chain link sliding over a fixed element, the improvement wherein said chain link comprises a blend (A) of a polyamide matrix and said moving element comprises a polyacetal, wherein the blend (A) comprises by weight 55 to 70% polyamide, 5 to 15% compatibilizer, and the balance consisting essentially of high density polyethylene.

27. An improvement according to claim 26, said fixed element being at least one of a rail, a slide way and a plate.

28. An improvement according to claim 26, wherein said fixed element comprises a plate.

29. An improvement according to claim 26, wherein the polyamide is PA-6.

30. An improvement according to claim 26, polyamide is PA-6, PA-6,6 or a mixture thereof.

* * * * *